(12) United States Patent
Tateishi et al.

(10) Patent No.: US 9,819,895 B2
(45) Date of Patent: Nov. 14, 2017

(54) SWITCHING POWER SUPPLY DEVICE

(71) Applicant: Rohm Co., Ltd., Kyoto (JP)

(72) Inventors: Tetsuo Tateishi, Kyoto (JP); Genki Tsuruyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/455,620

(22) Filed: Mar. 10, 2017

(65) Prior Publication Data
US 2017/0264853 A1    Sep. 14, 2017

(30) Foreign Application Priority Data

Mar. 14, 2016    (JP) .................................. 2016-049426

(51) Int. Cl.
H04N 5/63       (2006.01)
H02M 3/158     (2006.01)
H02M 1/32       (2007.01)

(52) U.S. Cl.
CPC .............. H04N 5/63 (2013.01); H02M 1/32 (2013.01); H02M 3/158 (2013.01)

(58) Field of Classification Search
CPC ........... H04N 5/63; H02M 1/32; H02M 3/158
USPC ....................................................... 348/730
See application file for complete search history.

(56) References Cited

U.S. PATENT DOCUMENTS

| | | | |
|---|---|---|---|
| 2006/0221528 A1* | 10/2006 | Li ........................... | H02M 1/32 361/100 |
| 2008/0203984 A1* | 8/2008 | Omi ........................ | H02M 1/36 323/272 |
| 2010/0019749 A1 | 1/2010 | Katsuya et al. | |
| 2010/0085675 A1* | 4/2010 | Oki ........................... | H02M 1/08 361/101 |
| 2011/0058285 A1* | 3/2011 | Wibben ................... | H02M 1/32 361/18 |
| 2011/0128277 A1* | 6/2011 | Murakami ............ | H03F 3/3022 345/212 |
| 2011/0141631 A1* | 6/2011 | Yabuzaki ............ | H02M 1/4225 361/18 |
| 2012/0049829 A1* | 3/2012 | Murakami .............. | H02M 1/32 323/288 |
| 2014/0376213 A1* | 12/2014 | Miedema ............ | F21V 33/0044 362/127 |

FOREIGN PATENT DOCUMENTS

JP          2010-035316       2/2010

* cited by examiner

*Primary Examiner* — Michael Lee
(74) *Attorney, Agent, or Firm* — Fish & Richardson P.C.

(57) ABSTRACT

A switching power supply device is a fixed on-time with bottom detection type switching power supply device, including an on-time extending portion, a low-side sensing type overcurrent protection portion using a bottom value threshold value, and a high-side sensing type overcurrent protection portion using a peak value threshold value. The high-side sensing type overcurrent protection portion sets the peak value threshold value to a value larger than the sum of the bottom value threshold value and a ripple component of inductor current during a period from start to end of a fixed on-time, and sets the peak value threshold value to a value equal to or smaller than the sum of the bottom value threshold value and the ripple component of the inductor current during a period after the fixed on-time elapses until at least the upper-side switch is turned off.

16 Claims, 9 Drawing Sheets

SWITCHING POWER SUPPLY DEVICE

CROSS-REFERENCE TO RELATED APPLICATIONS

This nonprovisional application claims priority under 35 U. S. C. §119(a) on Patent Application No. 2016-049426 filed in Japan on Mar. 14, 2016, the entire contents of which are hereby incorporated by reference.

BACKGROUND OF THE INVENTION

Field of the Invention

The present invention relates to an overcurrent protection function of a fixed on-time control type switching power supply device.

Description of Related Art

A fixed on-time control type switching power supply device has a feature that it can obtain higher load response characteristics with a simpler circuit structure than a fixed frequency control type switching power supply device (such as a voltage mode control type or a current mode control type). As one form of the fixed on-time control type switching power supply device, there is conventionally known a fixed on-time with bottom detection type switching power supply device (see, for example, JP-A-2010-35316).

FIGS. 8A and 8B are a circuit block diagram and an operation waveform chart illustrating a general example of a fixed on-time with bottom detection type switching power supply device. The fixed on-time with bottom detection type switching power supply device illustrated in FIG. 8A is a step-down type DC/DC converter, which steps down an input voltage Vin so as to generate a desired output voltage Vout. In the fixed on-time with bottom detection type switching power supply device illustrated in FIG. 8A, when it is detected that a feedback voltage Vfb drops to a reference voltage Vref, an upper-side transistor N1 is turned on so that a switch voltage Vsw becomes high level for a predetermined on-time Ton. Note that the upper-side transistor N1 is in OFF state during a period other than the predetermined on-time Ton. In addition, the upper-side transistor N1 and a lower-side transistor N2 are switched in a complementary manner.

When performing overcurrent protection in the fixed on-time with bottom detection type switching power supply device illustrated in FIG. 8A, a low-side sensing type overcurrent protection circuit is usually used. In the low-side sensing type overcurrent protection circuit, even if the feedback voltage Vfb drops to the reference voltage Vref during the on-time of the lower-side transistor N2, if an inductor current IL is larger than a bottom value threshold value THb, the upper-side transistor N1 is not turned on until the inductor current IL becomes the bottom value threshold value THb or less. Thus, in a state in which overcurrent may occur without overcurrent protection, a bottom value (minimum value) of the inductor current IL is adjusted to the bottom value threshold value THb.

Further, in the fixed on-time with bottom detection type switching power supply device illustrated in FIG. 8A, the upper-side transistor N1 is turned off after the predetermined on-time Ton elapses after the upper-side transistor N1 is turned on. Therefore, ignoring delay time generated in a comparator CMP1 or the like, in the state in which overcurrent may occur without overcurrent protection, the bottom value (minimum value) of the inductor current IL is the same as the bottom value threshold value THb, a peak value (maximum value) of the inductor current IL becomes the sum of the bottom value threshold value THb and a ripple component R of the inductor current IL (see FIG. 9). Note that the ripple component R of the inductor current IL is uniquely determined by a function of the predetermined on-time Ton, the input voltage Vin, and the output voltage Vout.

Therefore, in the fixed on-time with bottom detection type switching power supply device illustrated in FIG. 8A, an appropriate overcurrent protection can be achieved only by the low-side sensing type overcurrent protection circuit.

Here, the fixed on-time with bottom detection type switching power supply device illustrated in FIG. 8A may be additionally provided with a function of automatically extending the on-time of the upper-side transistor N1 for increasing on duty of the upper-side transistor N1 if the output voltage Vout at a time point when the predetermined on-time Ton elapses is lower than a specified value.

In the case where this function is additionally provided, when the on-time of the upper-side transistor N1 is extended to be longer than the predetermined on-time Ton, the ripple component R of the inductor current IL becomes larger than that when the on-time is not extended. Therefore, a high-side sensing type overcurrent protection circuit becomes necessary, which suppresses the peak value (maximum value) of the inductor current IL. The high-side sensing type overcurrent protection circuit turns off the upper-side transistor N1 at a time point when the inductor current IL becomes larger than a peak value threshold value THp during the on-time of the upper-side transistor N1.

However, there is a problem that if only the high-side sensing type overcurrent protection circuit is disposed so as to simply add the peak value threshold value THp, an operating frequency of the switching power supply device when the overcurrent protection operation is performed is changed from the operating frequency in the normal operation (in which the overcurrent protection operation is not performed). Specifically, as illustrated in FIG. 10, if a difference Dpb between the peak value threshold value THp and the bottom value threshold value THb is smaller than the ripple component R of the inductor current IL, the operating frequency of the switching power supply device in the overcurrent protection operation is increased from that in the normal operation. In addition, on the contrary, if the difference Dpb between the peak value threshold value THp and the bottom value threshold value THb is larger than the ripple component R of the inductor current IL as illustrated in FIG. 11, the operating frequency of the switching power supply device in the overcurrent protection operation is decreased from that in the normal operation. Note that broken lines illustrated in FIGS. 10 and 11 indicate the same waveform as that of the inductor current IL illustrated in FIG. 9, having the same frequency as the operating frequency of the switching power supply device in the normal operation.

SUMMARY OF THE INVENTION

It is an object of the present invention to provide a switching power supply device that can perform an appropriate overcurrent protection without changing an operating frequency, a television set including the switching power supply device, and a semiconductor integrated circuit constituting at least a part of the switching power supply device.

A switching power supply device disclosed in this specification includes a switching control portion arranged to alternately switch between a fixed on-time having a fixed length in which an upper-side switch is turned on while a lower-side switch is turned off, and a variable off-time having a variable length in which the upper-side switch is turned off while the lower-side switch is turned on, so as to flow current in an inductor, for stepping down an input voltage to generate and output voltage; an on-time extending portion arranged to extend the on-time of the upper-side switch, if the output voltage is lower than a specified value at the time point when the fixed on-time elapses, until the output voltage reaches the specified value regardless of the fixed on-time; a lower-side overcurrent protection portion arranged to inhibit the lower-side switch from being turned off, if the current flowing in the inductor is larger than a bottom value threshold value at the time point when a feedback voltage corresponding to the output voltage is decreased to a reference voltage, until the current flowing in the inductor becomes the bottom value threshold value or less; and an upper-side overcurrent protection portion arranged to forcibly turn off the upper-side switch at the time point when the current flowing in the inductor becomes larger than a peak value threshold value during the on-time of the upper-side switch. The upper-side overcurrent protection portion sets the peak value threshold value to a value larger than the sum of the bottom value threshold value and a ripple component of the current flowing in the inductor during a period from start to end of the fixed on-time, and sets the peak value threshold value to a value equal to or smaller than the sum of the bottom value threshold value and the ripple component of the current flowing in the inductor during a period after the fixed on-time elapses until at least the upper-side switch is turned off.

In addition, a television set disclosed in this specification includes a tuner portion arranged to select a broadcasting signal of a desired channel from a reception signal; a decoder portion arranged to generate a video signal and an audio signal from the broadcasting signal selected by the tuner; a display portion arranged to output an image of the video signal; a speaker portion arranged to output sound of the audio signal; an operating portion arranged to receive a user's operation; an interface portion arranged to receive an external input signal; a control portion arranged to integrally control the individual portions; and a power supply unit arranged to supply electric power to the individual portions, in which the power supply unit includes the switching power supply device having the structure described above.

In addition, a semiconductor integrated circuit disclosed in this specification, which constitutes at least a part of a switching power supply device, includes a switching control portion arranged to alternately switch between a fixed on-time having a fixed length in which an upper-side switch is turned on while a lower-side switch is turned off, and a variable off-time having a variable length in which the upper-side switch is turned off while the lower-side switch is turned on, so as to flow current in an inductor, for stepping down an input voltage to generate and output voltage; an on-time extending portion arranged to extend the on-time of the upper-side switch, if the output voltage is lower than a specified value at the time point when the fixed on-time elapses, until the output voltage reaches the specified value regardless of the fixed on-time; a lower-side overcurrent protection portion arranged to inhibit the lower-side switch from being turned off, if the current flowing in the inductor is larger than a bottom value threshold value at the time point when a feedback voltage corresponding to the output voltage is decreased to a reference voltage, until the current flowing in the inductor becomes the bottom value threshold value or less; and an upper-side overcurrent protection portion arranged to forcibly turn off the upper-side switch at the time point when the current flowing in the inductor becomes larger than a peak value threshold value during the on-time of the upper-side switch. The upper-side overcurrent protection portion sets the peak value threshold value to a value larger than the sum of the bottom value threshold value and a ripple component of the current flowing in the inductor during a period from start to end of the fixed on-time, and sets the peak value threshold value to a value equal to or smaller than the sum of the bottom value threshold value and the ripple component of the current flowing in the inductor during a period after the fixed on-time elapses until at least the upper-side switch is turned off.

Meanings and effects of the present invention will become apparent from the description of embodiment given below. However, the embodiment described below is merely an example of the embodiment of the present invention. The present invention and meanings of terms of structural elements are not limited to those described below in the embodiment.

DETAILED DESCRIPTION OF THE PREFERRED EMBODIMENTS

<Switching Power Supply Device (First Structural Example)>

Figure 1:
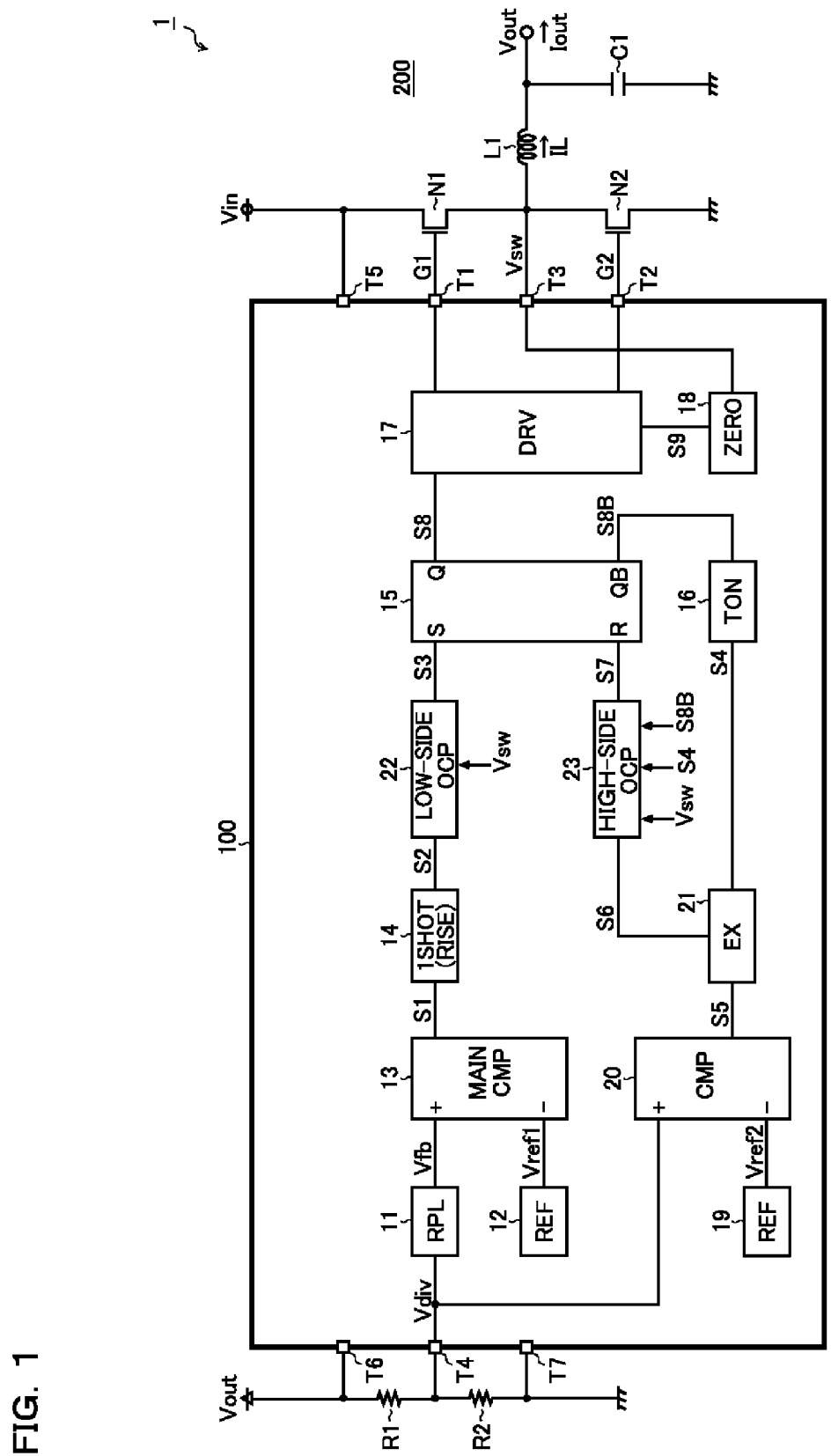
FIG. 1 is a block diagram illustrating an overall structure of a first structural example of a switching power supply device.

FIG. 1 is a block diagram illustrating an overall structure of a first structural example of a switching power supply device. A switching power supply device 1 of this structural example is a step-down type DC/DC converter, which generates an output voltage Vout from an input voltage Vin by a nonlinear control method (fixed on-time with bottom detection method). The switching power supply device 1 includes a semiconductor device 100, and an switch output stage 200 constituted of various discrete components (N-channel metal oxide semiconductor (MOS) field-effect upper-side transistor N1 and lower-side transistor N2, an inductor L1, a capacitor C1, and resistors R1 and R2) connected externally to the semiconductor device 100.

The semiconductor device 100 is a main body (so-called power supply control IC) that integrally controls overall operation of the switching power supply device 1. The semiconductor device 100 has external terminals T1 to T7 (an upper-side gate terminal T1, a lower-side gate terminal T2, a switch terminal T3, a feedback terminal T4, an input voltage terminal T5, an output voltage terminal T6, and a ground terminal T7) as means to establish electrical connection with the outside of the device.

The external terminal T1 is connected to the gate of the upper-side transistor N1. The external terminal T2 is connected to the gate of the lower-side transistor N2. The external terminal T3 is connected to the application terminal of the switch voltage Vsw (the connection node between the source of the upper-side transistor N1 and the drain of the lower-side transistor N2). The external terminal T4 is connected to the application terminal of a divided voltage Vdiv (the connection node between the resistor R1 and the resistor R2). The external terminal T5 is connected to the application terminal of the input voltage Vin. The external terminal T6 is connected to the application terminal of the output voltage Vout. The external terminal T7 is connected to the ground terminal.

Next, connection relationship of the discrete components connected externally to the semiconductor device 100 is described. The drain of the upper-side transistor N1 is connected to the application terminal of the input voltage Vin. The source of the lower-side transistor N2 is connected to the ground terminal. The source of the upper-side transistor N1 and the drain of the lower-side transistor N2 are both connected to a first terminal of the inductor L1. A second terminal of the inductor L1 and the first terminal of the capacitor C1 are both connected to the application terminal of the output voltage Vout. A second terminal of the capacitor C1 is connected to the ground terminal. The resistor R1 and the resistor R2 are connected in series between the application terminal of the output voltage Vout and the ground terminal.

The upper-side transistor N1 is an output transistor, which is on-off controlled according to a gate signal G1 input from the external terminal T1. The lower-side transistor N2 is a synchronous rectification transistor, which is on-off controlled according to a gate signal G2 input from the external terminal T2. Note that a diode may be used instead of the lower-side transistor N2 as a rectifier element. In addition, the upper-side transistor N1 and the lower-side transistor N2 may be included in the semiconductor device 100. The inductor L1 and the capacitor C1 function as a rectification smoothing portion that rectifies and smoothes the switch voltage Vsw of a rectangular wave at the external terminal T3 so as to generate the output voltage Vout. The resistors R1 and R2 function as a divided voltage generating portion that divides the output voltage Vout so as to generate the divided voltage Vdiv. However, if the output voltage Vout is within an input dynamic range of a ripple injection circuit 11 (or a main comparator 13), the divided voltage generating portion can be eliminated.

Next, an internal structure of the semiconductor device 100 is described. In the semiconductor device 100, there are integrated the ripple injection circuit 11, a reference voltage generating circuit 12, the main comparator 13, a one-shot pulse generating circuit 14, an RS flip-flop 15, an on-time setting circuit 16, a gate driver circuit 17, a reverse current detecting circuit 18, a reference voltage generating circuit 19, a comparator 20, an on-time extending circuit 21, a low-side sensing type overcurrent protection circuit 22, and a high-side sensing type overcurrent protection circuit 23.

The ripple injection circuit 11 adds a ripple voltage Vrpl (a pseudo ripple component that simulates inductor current IL flowing in the inductor L1) to the divided voltage Vdiv so as to generate a feedback voltage Vfb (=Vdiv+Vrpl). By introducing this ripple injection technique, even if the ripple component of the output voltage Vout (therefore the divided voltage Vdiv) is not so large, stable switching control can be performed. Thus, it is possible to use a laminated ceramic capacitor or the like having a small ESR as the capacitor C1. However, if the ripple component of the output voltage Vout is sufficiently large, it is possible to eliminate the ripple injection circuit 11.

The reference voltage generating circuit 12 generates a predetermined first reference voltage Vref1.

The main comparator 13 compares the feedback voltage Vfb input to a noninverting input terminal (+) with a first reference voltage Vref1 input to an inverting input terminal (−) so as to generate a comparison signal S1. The comparison signal S1 becomes high level when the feedback voltage Vfb is higher than the first reference voltage Vref1, and it becomes low level when the feedback voltage Vfb is lower than the first reference voltage Vref1.

The one-shot pulse generating circuit 14 generates a one-shot pulse (e.g. a falling pulse) in a set signal S2 by a trigger of a falling edge of the comparison signal S1.

The RS flip-flop 15 sets an output signal S8 to high level at a pulse edge (e.g. a falling edge) of a set signal S3 input to a set terminal (S), and it resets the output signal S8 to low level at a pulse edge (e.g. a falling edge) of a reset signal S7 input to a reset terminal (R). Note that if the low-side sensing type overcurrent protection circuit 22 does not perform the overcurrent protection operation, the set signal S3 becomes the same signal as the set signal S2 output from the one-shot pulse generating circuit 14. In addition, if the on-time extending circuit 21 does not extend the on-time of the upper-side transistor N1 and if the high-side sensing type overcurrent protection circuit 23 does not perform the overcurrent protection operation, the reset signal S7 becomes the same signal as a reset signal S4 output from the on-time setting circuit 16.

The on-time setting circuit 16 generates a one-shot pulse (e.g. a falling pulse) in the reset signal S4 after a predetermined on-time Ton elapses after an inverted output signal S8B of the RS flip-flop 15 (i.e. a logically inverted signal of the output signal S4) falls to low level. The predetermined on-time Ton is a time determined, for example, by a function of the input voltage Vin and the output voltage Vout or an output set voltage (target value of the output voltage Vout).

The gate driver circuit 17 generates the gate signals G1 and G2 according to the output signal S8 of the RS flip-flop 15 so as to switch the upper-side transistor N1 and the lower-side transistor N2 in a complementary manner. Note that the language "in a complementary manner" used in this specification means not only the case where on and off of the upper-side transistor N1 and the lower-side transistor N2 are completely opposite, but also the case where a delay time is provided (the case where a so-called simultaneous off period (dead time) is provided) between on and off timings of the upper-side transistor N1 and the lower-side transistor N2 for preventing through current.

The reverse current detecting circuit 18 monitors reverse current of the inductor current IL (inductor current IL flowing from the inductor L1 via the lower-side transistor N2 to the ground terminal) so as to generate a reverse current detection signal S9. The reverse current detection signal S9 is latched to high level (a logical level when the reverse current is detected) at the time point when the reverse current of the inductor current IL is detected, and it is reset to low level (a logical level when the reverse current is not detected) at a rising edge of the gate signal G1 in the next period. Note that, as a method of monitoring the reverse current of the inductor current IL, for example, it is preferred to detect a zero-cross point at which the switch voltage Vsw is switched from negative to positive during the on-period of the lower-side transistor N2. When the reverse current detection signal S9 is high level, the gate driver circuit 17 generates the gate signal G2 so as to forcibly turn off the lower-side transistor N2 regardless of the output signal S8.

Note that the ripple injection circuit 11, the reference voltage generating circuit 12, the main comparator 13, the one-shot pulse generating circuit 14, the RS flip-flop 15, the on-time setting circuit 16, the gate driver circuit 17, and the reverse current detecting circuit 18 described above function as a switching control circuit of a nonlinear control method (fixed on-time with bottom detection method in this structural example), which performs on-off control of the upper-side transistor N1 and the lower-side transistor N2 according to a comparison result between the feedback voltage Vfb and the first reference voltage Vref1, so as to generate the output voltage Vout from the input voltage Vin. In other words, the ripple injection circuit 11, the reference voltage generating circuit 12, the main comparator 13, the one-shot pulse generating circuit 14, the RS flip-flop 15, the on-time setting circuit 16, the gate driver circuit 17, and the reverse current detecting circuit 18 described above function as the switching control circuit, which alternately switches between a fixed on-time having a fixed length (predetermined on-time Ton) in which the upper-side transistor N1 is turned on while the lower-side transistor N2 is turned off, and a variable off-time having a variable length in which the upper-side transistor N1 is turned off while the lower-side transistor N2 is turned on, so that the inductor current IL flows, and thereby steps down the input voltage Vin to generate the output voltage Vout.

Details of the reference voltage generating circuit 19, the comparator 20, the on-time extending circuit 21, the low-side sensing type overcurrent protection circuit 22, and the high-side sensing type overcurrent protection circuit 23 will be described later.

<Switching Operation>

Figure 2:
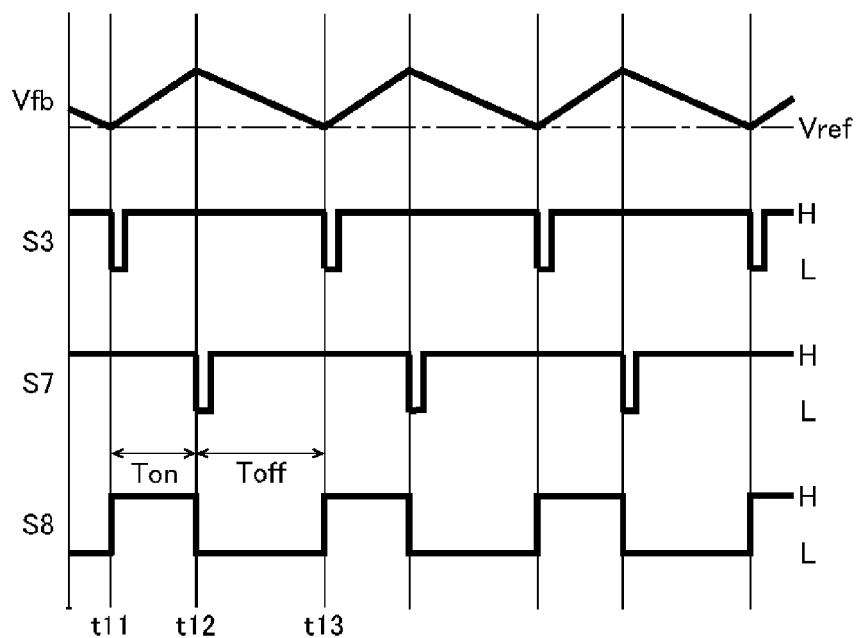
FIG. 2 is a timing chart illustrating a switching operation with heavy load.

FIG. 2 is a timing chart illustrating a switching operation with heavy load (continuous current mode), in which the feedback voltage Vfb, the set signal S3, the reset signal S7, and the output signal S8 are shown in order from the upper side. Note that FIG. 2 is the timing chart in a case where the on-time extending circuit 21 does not extend the on-time of the upper-side transistor N1 and each of the low-side sensing type overcurrent protection circuit 22 and the high-side sensing type overcurrent protection circuit 23 does not perform the overcurrent protection operation.

When the feedback voltage Vfb drops to the first reference voltage Vref1 at time point t11, the set signal S3 falls to low level, and the output signal S8 is changed to high level. Therefore, the upper-side transistor N1 is turned on so that the feedback voltage Vfb is changed to increase.

After that, the on-time Ton elapses and when the reset signal S7 drops to the low level at time point t12, the output signal S8 is changed to low level. Therefore, the upper-side transistor N1 is turned off so that the feedback voltage Vfb is changed to decrease again.

The gate driver circuit 17 generates the gate signals G1 and G2 according to the output signal S8 and uses the gate signals G1 and G2 to perform on-off control of the upper-side transistor N1 and the lower-side transistor N2. Specifically, when the output signal S8 is high level, basically, the gate signal G1 becomes high level so that the upper-side transistor N1 is turned on, while the gate signal G2 becomes low level so that the lower-side transistor N2 is turned off. On the contrary, when the output signal S8 is low level, basically, the gate signal G1 becomes low level so that the upper-side transistor N1 is turned off, while the gate signal G2 becomes high level so that the lower-side transistor N2 is turned on.

With the on-off control of the upper-side transistor N1 and the lower-side transistor N2 described above, the switch voltage Vsw having a rectangular waveform appears at the external terminal T3. The switch voltage Vsw is rectified and smoothed by the inductor L1 and the capacitor C1 so that the output voltage Vout is generated. Note that the output voltage Vout is divided by the resistors R1 and R2 so that the divided voltage Vdiv (therefore the feedback voltage Vfb) is generated. By this output feedback control, the switching power supply device 1 generates the desired output voltage Vout from the input voltage Vin with the very simple structure.

<Reverse Current Cut-Off Operation>

Figure 3:
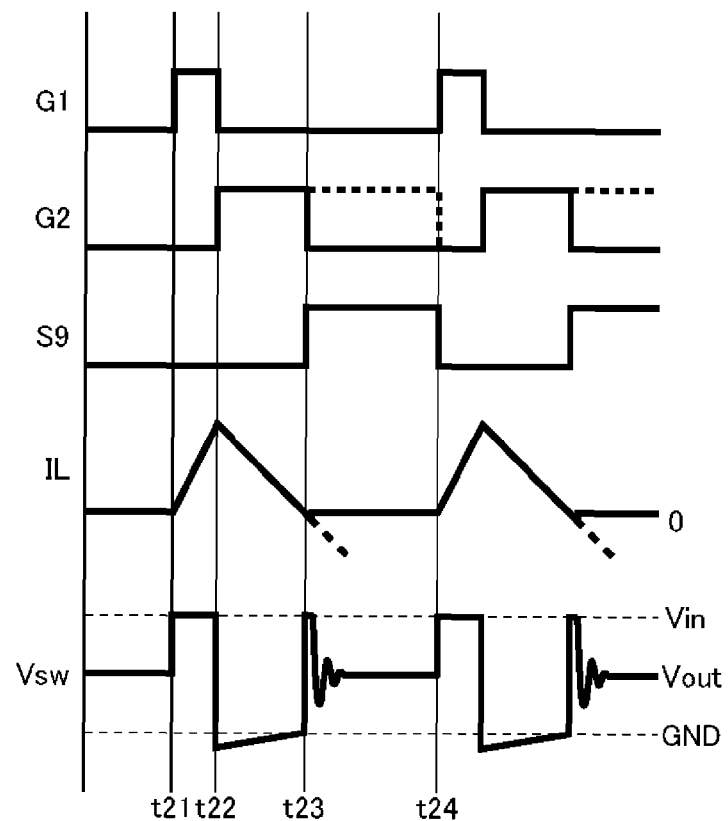
FIG. 3 is a timing chart illustrating a reverse current cut-off operation with light load.

FIG. 3 is a timing chart illustrating a reverse current cut-off operation with light load (discontinuous current mode), in which the gate signals G1 and G2, the reverse current detection signal S9, the inductor current IL, and the switch voltage Vsw are shown in order from the upper side. Note that FIG. 3 is the timing chart in the case where the on-time extending circuit 21 does not extend the on-time of the upper-side transistor N1 and each of the low-side sensing type overcurrent protection circuit 22 and the high-side sensing type overcurrent protection circuit 23 does not perform the overcurrent protection operation.

From time point t21 to time point t22, the gate signal G1 is high level and the gate signal G2 is low level, and hence the upper-side transistor N1 is turned on while the lower-side transistor N2 is turned off. Therefore, from the time point t21 to the time point t22, the switch voltage Vsw increases substantially to the input voltage Vin so that the inductor current IL is being increased.

When the gate signal G1 is decreased to low level while the gate signal G2 is increased to high level at the time point t22, the upper-side transistor N1 is turned off so that the lower-side transistor N2 is turned on. Therefore the switch voltage Vsw is decreased to a negative voltage (=GND−IL× RN2, where RN2 is the on resistance of the lower-side transistor N2), and hence the inductor current IL is changed to decrease.

Here, in heavy load with sufficiently large output current Iout flowing in the load, the amount of energy stored in the inductor L1 is large, and hence the inductor current IL continues to flow to the load without becoming negative until time point t24 at which the gate signal G1 is increased to high level again, so that the switch voltage Vsw is maintained at a negative voltage. On the other hand, in light load with small output current Iout flowing in the load, the amount of energy stored in the inductor L1 is small, and hence the inductor current IL becomes negative at time point t23. Thus, the reverse current of the inductor current IL is generated, and the polarity of the switch voltage Vsw is changed from negative to positive. In this state, the charge stored in the capacitor C1 is returned to the input side via the inductor L1, and hence efficiency in light load is decreased.

Therefore, the switching power supply device 1 detects the reverse current of the inductor current IL (inversion of the switch voltage Vsw) using the reverse current detecting circuit 18, so as to forcibly turn off the lower-side transistor N2 in the high level period of the reverse current detection signal S9 (from the time point t23 to the time point t24). With this structure, the reverse current of the inductor current IL can be quickly cut off, and hence the efficiency decrease in light load can be canceled.

<On-Time Extending Operation>

The switching power supply device 1 realizes the function of automatically extending the on-time of the upper-side transistor N1 for increasing the on duty of the upper-side transistor N1 when the output voltage Vout is lower than a specified value at the time point when a predetermined on-time Ton elapses, by using the reference voltage generating circuit 19, the comparator 20, and the on-time extending circuit 21.

The reference voltage generating circuit 19 generates a predetermined second reference voltage Vref2. The second reference voltage Vref2 is set to be equal to the value obtained by dividing the specified value by the resistor R1 and the resistor R2.

The comparator 20 compares the divided voltage Vdiv input to the noninverting input terminal (+) with the second reference voltage Vref2 input to the inverting input terminal (−) so as to generate a comparison signal S5. The comparison signal S5 becomes high level when the divided voltage Vdiv is higher than the second reference voltage Vref2, while it becomes low level when the divided voltage Vdiv is lower than the second reference voltage Vref2.

If the comparison signal S5 is high level at the time point when the reset signal S4 is decreased to low level as the on-time Ton elapses, the on-time extending circuit 21 outputs the reset signal S4 as a reset signal S6 without change. In this case, the on-time extending circuit 21 does not perform the on-time extending operation.

On the other hand, if the comparison signal S5 is low level at the time point when the reset signal S4 is decreased to low level as the on-time Ton elapses, the on-time extending circuit 21 maintains the reset signal S6 at high level regardless of the fall of the reset signal S4, and after that generates a one-shot pulse (e.g. a falling pulse) in the reset signal S6 by a trigger of a rising edge of the comparison signal S5. In this case, the on-time extending circuit 21 performs the on-time extending operation for extending the on-time of the upper-side transistor N1 until the output voltage Vout reaches the specified value.

Note that when the high-side sensing type overcurrent protection circuit 23 does not perform the overcurrent protection operation, the reset signal S7 becomes the same signal as the reset signal S6 output from the on-time extending circuit 21.

In addition, instead of using the comparison signal S5 output from the comparator 20, it is possible to use the comparison signal S1 output from the main comparator 13. In this case, the comparator 20 and the reference voltage generating circuit 19 that outputs the second reference voltage Vref2 are not necessary.

<Overcurrent Protection Operation>

The switching power supply device 1 includes the low-side sensing type overcurrent protection circuit 22 and the high-side sensing type overcurrent protection circuit 23 as described above.

The low-side sensing type overcurrent protection circuit 22 detects the inductor current IL during the off-time of the upper-side transistor N1 from the switch voltage Vsw obtained during the on-time of the lower-side transistor N2. The switch voltage Vsw obtained during the on-time of the lower-side transistor N2 is the value obtained by subtracting the product of the inductor current IL and the on resistance of the lower-side transistor N2 during the off-time of the upper-side transistor N1 from the ground potential. Note that it is possible to detect the inductor current IL during the off-time of the upper-side transistor N1 by a method other than that of this example.

The low-side sensing type overcurrent protection circuit 22 compares the voltage corresponding to the detected inductor current IL with the voltage corresponding to the bottom value threshold value THb by an internal comparator, so as to check a magnitude relationship between the inductor current IL and the bottom value threshold value THb.

If the inductor current IL is the bottom value threshold value THb or less at the time point when the set signal S2 is decreased to low level due to the decrease of the feedback voltage Vfb to the first reference voltage Vref1, the low-side sensing type overcurrent protection circuit 22 outputs the set signal S2 as the set signal S3 without change. In this case, the low-side sensing type overcurrent protection circuit 22 does not perform the overcurrent protection operation.

On the other hand, if the inductor current IL is more than the bottom value threshold value THb at the time point when the set signal S2 is decreased to the low level due to the decrease of the feedback voltage Vfb to the first reference voltage Vref1, the low-side sensing type overcurrent protection circuit 22 maintains the set signal S3 at high level regardless of the fall of the set signal S2, and after that generates a one-shot pulse (e.g. a falling pulse) in the set signal S3 by a trigger of the inductor current IL being the bottom value threshold value THb or less. In this case, in the state in which overcurrent may occur without overcurrent protection, the low-side sensing type overcurrent protection circuit 22 performs the overcurrent protection operation, and hence the bottom value (minimum value) of the inductor current IL is adjusted to the bottom value threshold value THb.

The high-side sensing type overcurrent protection circuit 23 detects the inductor current IL during the on-time of the upper-side transistor N1 from the switch voltage Vsw obtained during the on-time of the upper-side transistor N1. The switch voltage Vsw obtained during the on-time of the upper-side transistor N1 is a value obtained by subtracting the product of the inductor current IL and the on resistance of the upper-side transistor N1 during the on-time of the upper-side transistor N1 from the input voltage Vin. Note that it is possible to detect the inductor current IL during the on-time of the upper-side transistor N1 by a method other than that of this example.

The high-side sensing type overcurrent protection circuit 23 compares the voltage corresponding to the detected inductor current IL with the voltage corresponding to the peak value threshold value THp by the internal comparator, so as to check a magnitude relationship between the inductor current IL and the peak value threshold value THp. A voltage source that generates the voltage corresponding to the peak value threshold value THp is a variable voltage source, and the peak value threshold value THp can be changed. In this example, the high-side sensing type overcurrent protection circuit 23 periodically changes the peak value threshold value THp based on the reset signal S4 output from the on-time setting circuit 16 and the inverted output signal S8B of the RS flip-flop 15.

Specifically, in the period after the upper-side transistor N1 is turned on until a predetermined on-time Ton elapses (in the period after the inverted output signal S8B of the RS flip-flop 15 is decreased to low level until the reset signal S4 is decreased to low level), the peak value threshold value THp is set to a value larger than the sum of the ripple component R of the inductor current IL and the bottom value threshold value THb. On the other hand, in the period after the predetermined on-time Ton elapses until at least the upper-side transistor N1 is turned off, the peak value threshold value THp is set to be equal to or less than the sum of the ripple component R of the inductor current IL and the bottom value threshold value THb. In this example, in the period after the predetermined on-time Ton elapses until the upper-side transistor N1 is turned on next time (in the period after the reset signal S4 is decreased to low level until the inverted output signal S8B of the RS flip-flop 15 is decreased to low level next time), the peak value threshold value THp is set to be equal to or less than the sum of the ripple component R of the inductor current IL and the bottom value threshold value THb. When setting the peak value threshold value THp to be equal to or less than the sum of the ripple component R of the inductor current IL and the bottom value threshold value THb, it is preferred to set the peak value threshold value THp to be equal to or more than the bottom value threshold value THb.

Figure 4:
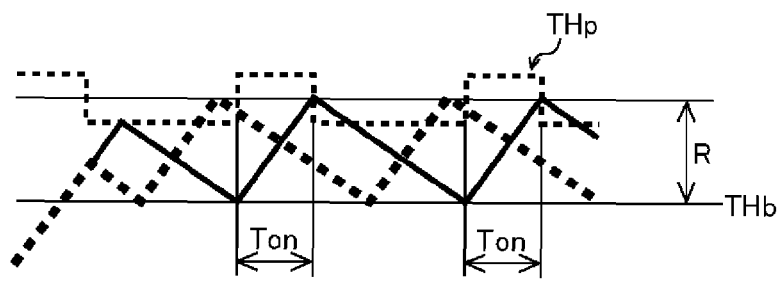
FIG. 4 is a waveform chart of inductor current when overcurrent protection is performed.
Figure 9:
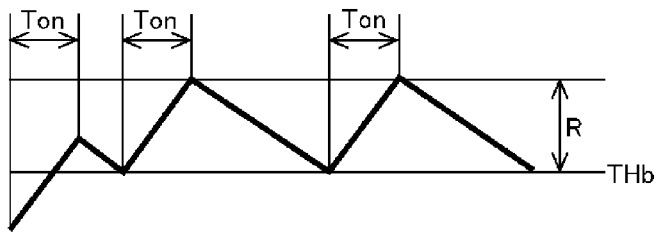
FIG. 9 is a waveform chart of the inductor current when the overcurrent protection by a bottom value threshold value is performed.
Figure 10:
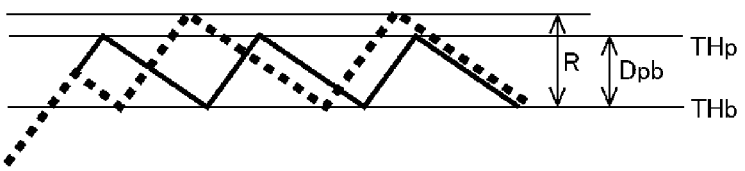
FIG. 10 is a waveform chart of the inductor current when the overcurrent protection by the bottom value threshold value and a peak value threshold value is performed.
Figure 11:
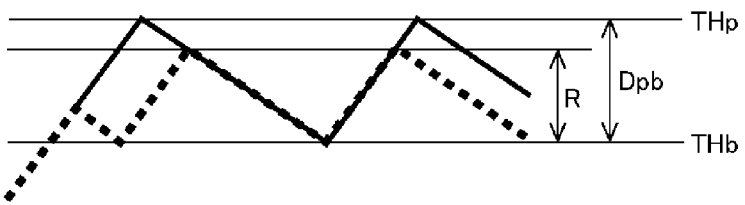
FIG. 11 is a waveform chart of the inductor current when the overcurrent protection by the bottom value threshold value and the peak value threshold value is performed.

FIG. 4 is a waveform chart of the inductor current IL when the low-side sensing type overcurrent protection circuit 22 and the high-side sensing type overcurrent protection circuit 23 perform the overcurrent protection operation. Note that a thick broken line illustrated in FIG. 4 indicates the same waveform as the inductor current IL illustrated in FIG. 9, having the same frequency as the operating frequency of the switching power supply device in the normal operation. In addition, a thin broken line illustrated in FIG. 4 indicates the peak value threshold value THp.

As described above, in the period after the upper-side transistor N1 is turned on until a predetermined on-time Ton elapses, the peak value threshold value THp is set to a value larger than the sum of the ripple component R of the inductor current IL and the bottom value threshold value THb. Therefore, the overcurrent protection is not enabled basically by the peak value threshold value THp, and the upper-side transistor N1 maintains the ON state. Further, in an unexpected accident, even if the inductor current IL exceeds the sum of the ripple component R of the inductor current IL and the bottom value threshold value THb in the period after the upper-side transistor N1 is turned on until a predetermined on-time Ton elapses, the overcurrent protection can be enabled by the peak value threshold value THp.

In addition, as described above, in the period after the predetermined on-time Ton elapses until the upper-side transistor N1 is turned on next time, the peak value threshold value THp is set to be equal to or less than the sum of the ripple component R of the inductor current IL and the bottom value threshold value THb. Therefore, even if the output voltage Vout is lower than the specified value at the time point when the predetermined on-time Ton elapses and the on-time extending operation is performed, ignoring the delay time generated in the high-side sensing type overcurrent protection circuit 23 or the like, the overcurrent protection is enabled by the peak value threshold value THp promptly at the time point when the predetermined on-time Ton elapses. Then, the upper-side transistor N1 is turned off so that the inductor current IL is being decreased.

By the operation as described above, even while the low-side sensing type overcurrent protection circuit 22 and the high-side sensing type overcurrent protection circuit 23 are performing the overcurrent protection operation, the frequency of the inductor current IL can be substantially the same as the operating frequency of the switching power supply device in the normal operation.

<Switching Power Supply Device (Second Structural Example)>

Figure 5A:
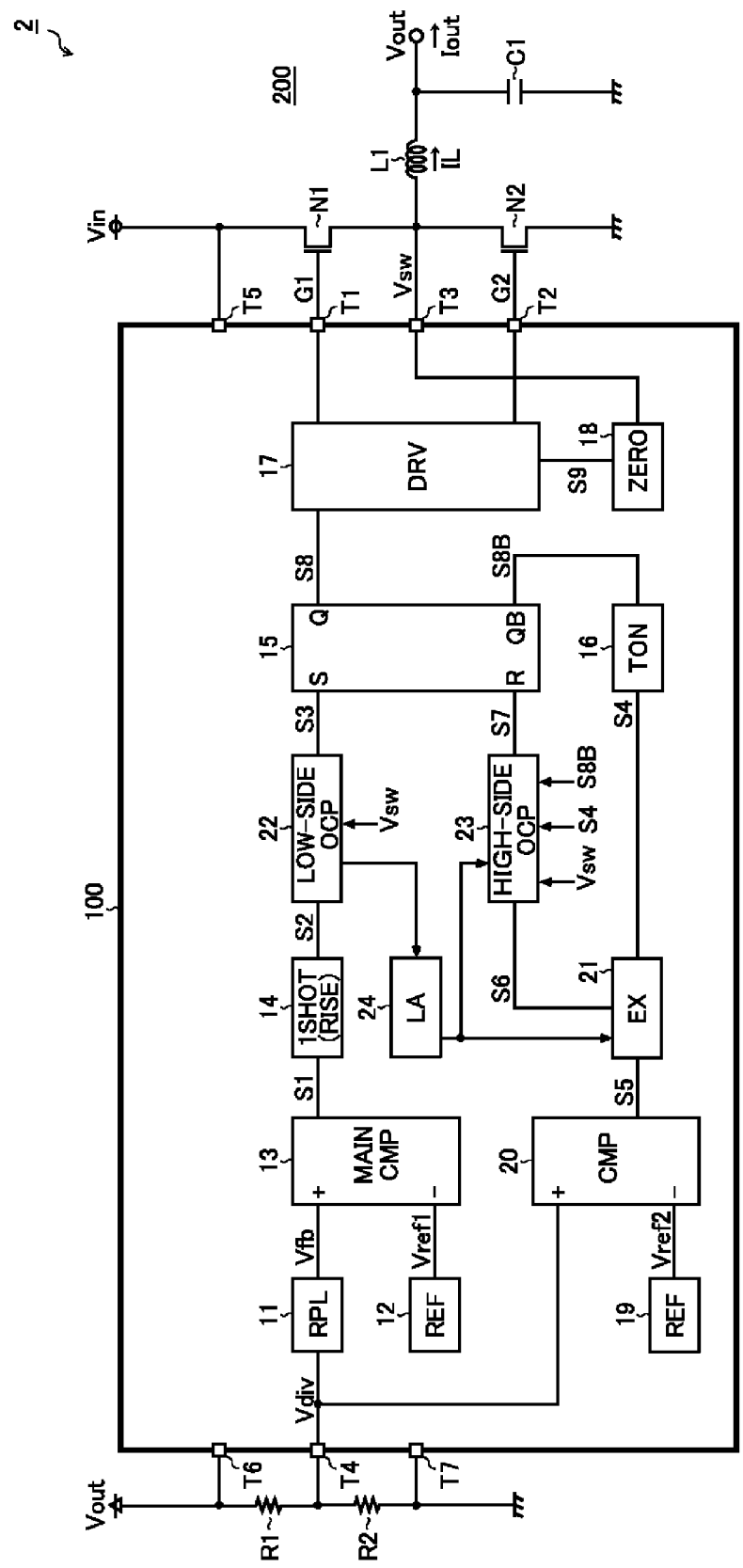
FIG. 5A is a block diagram illustrating an overall structure of a second structural example of the switching power supply device.

FIG. 5A is a block diagram illustrating an overall structure of a second structural example of the switching power supply device. A switching power supply device 2 illustrated in FIG. 5A has a structure in which a latch portion 24 is additionally disposed in the semiconductor device 100 of the switching power supply device 1 illustrated in FIG. 1. In this structure too, instead of using the comparison signal S5 output from the comparator 20, it is possible to use the comparison signal S1 output from the main comparator 13. In this case, the comparator 20 and the reference voltage generating circuit 19 that outputs the second reference voltage Vref2 are not necessary.

The switching power supply device 1 illustrated in FIG. 1 has the structure in which the peak value threshold value THp is changed periodically and continuously during the overcurrent protection operation by the low-side sensing type overcurrent protection circuit 22 and the high-side sensing type overcurrent protection circuit 23. Therefore delay time is generated in the high-side sensing type overcurrent protection circuit 23 every time when the peak value threshold value THp is changed.

The switching power supply device 2 illustrated in FIG. 5 reduces the changes of the peak value threshold value THp as much as possible during the overcurrent protection operation by the low-side sensing type overcurrent protection circuit 22 and the high-side sensing type overcurrent protection circuit 23, and hence reduces frequency of generation of delay time in the high-side sensing type overcurrent protection circuit 23. In this way, even while the low-side sensing type overcurrent protection circuit 22 and the high-side sensing type overcurrent protection circuit 23 are performing the overcurrent protection operation, the frequency of the inductor current IL can be closer to the operating frequency of the switching power supply device in the normal operation.

The latch portion 24 operates based on a signal from the high-side sensing type overcurrent protection circuit 23. When the upper-side transistor N1 is turned on at the time point when the overcurrent protection is enabled by the bottom value threshold value THb so that the inductor current IL becomes the bottom value threshold value THb or less, the latch portion 24 latches the state. Then, in periods of the next time and after, if the overcurrent protection is not enabled by the bottom value threshold value THb, the latch portion 24 resets the latched state.

In this example, operation of the on-time extending circuit 21 is limited by a signal from the latch portion 24. In other words, if the latch portion 24 is in the latched state described above, even if the comparison signal S5 is low level at the time point when the reset signal S4 is decreased to the low level as the on-time Ton elapses, the on-time extending circuit 21 does not perform the on-time extending operation and outputs the reset signal S4 as the reset signal S6 without change.

In addition, in this example, the change of the peak value threshold value THp in the high-side sensing type overcurrent protection circuit 23 is limited by the signal from the latch portion 24. In other words, when the latch portion 24 is in the latched state described above, the peak value threshold value THp is set to a value larger than the sum of the ripple component R of the inductor current IL and the bottom value threshold value THb (see FIG. 5B). Even with this setting, because the on-time extending operation is not performed, the upper-side transistor N1 is securely turned off when the on-time Ton elapses.

Figure 5B:
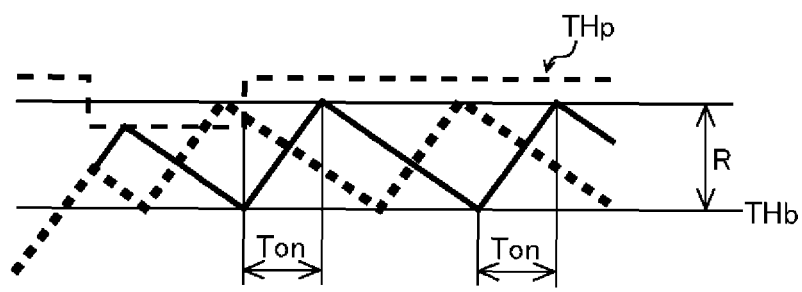
FIG. 5B is a waveform chart of the inductor current when the overcurrent protection is performed.

Note that FIG. 5B is a waveform chart of the inductor current IL when the low-side sensing type overcurrent protection circuit 22 and the high-side sensing type overcurrent protection circuit 23 are performing the overcurrent protection operation. Note that a thick broken line illustrated in FIG. 5B indicates the same waveform as the inductor current IL illustrated in FIG. 9, having the same frequency as the operating frequency of the switching power supply device in the normal operation. In addition, a thin broken line illustrated in FIG. 5B indicates the peak value threshold value THp.

<Application to Television Set>

Figure 6:
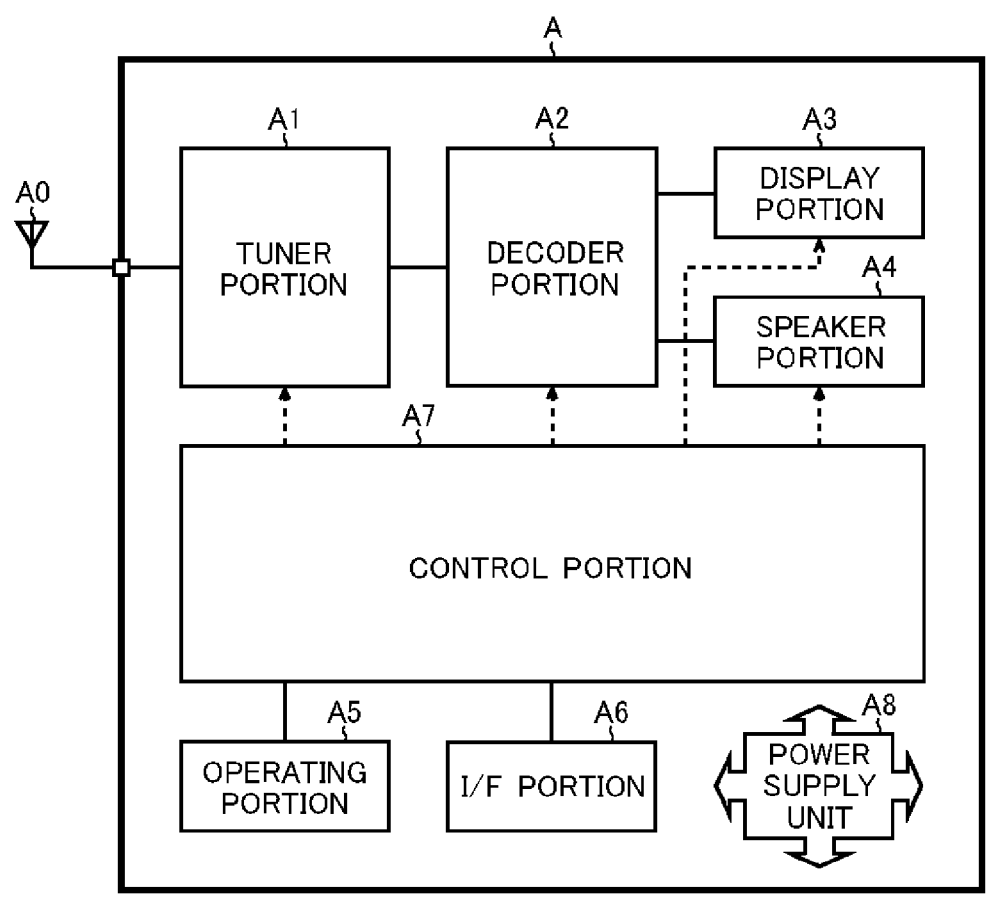
FIG. 6 is a block diagram illustrating a structural example of a television set including the switching power supply device.
Figure 7A:
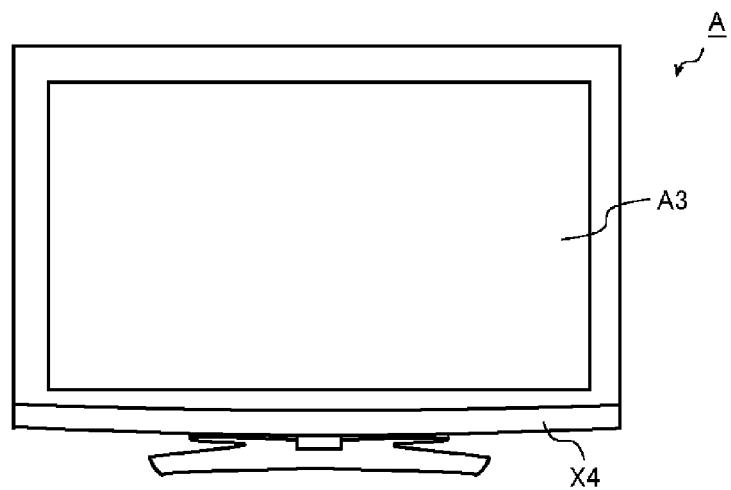
FIG. 7A is a front view of the television set including the switching power supply device.
Figure 7B:
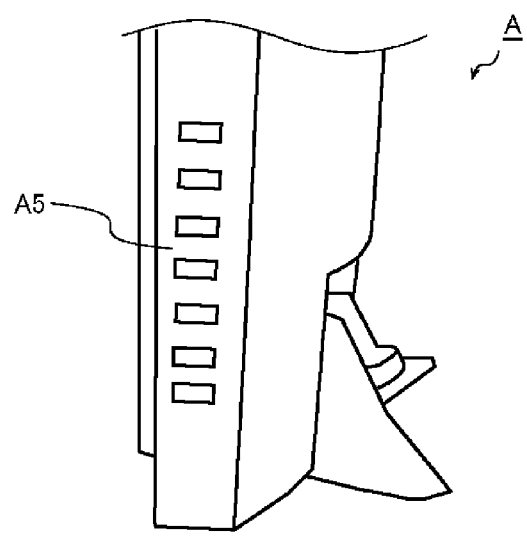
FIG. 7B is a side view of the television set including the switching power supply device.
Figure 7C:
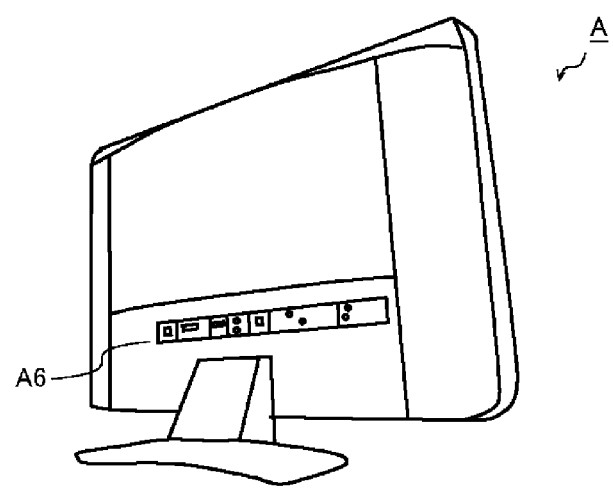
FIG. 7C is a rear view of the television set including the switching power supply device.
Figure 8A:
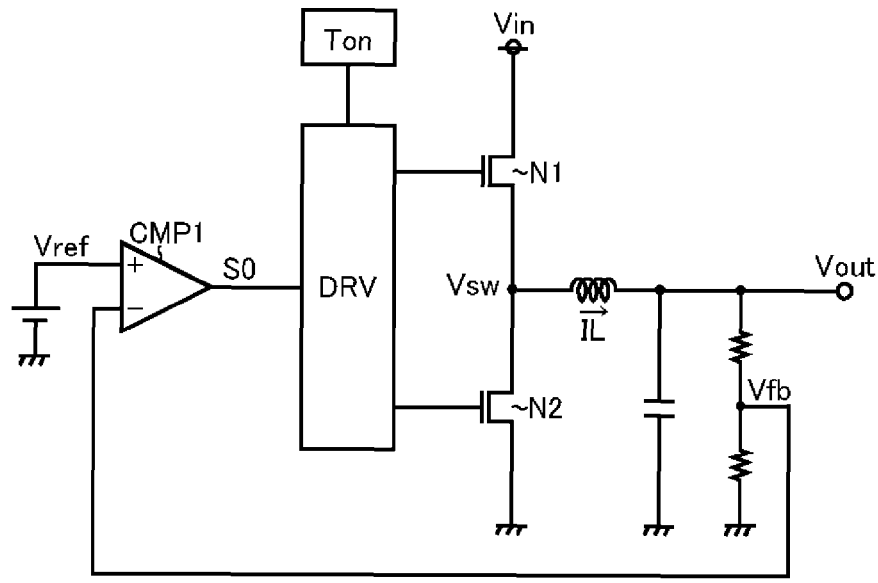
FIG. 8A is a circuit block diagram illustrating a general example of a fixed on-time with bottom detection type switching power supply device.
Figure 8B:
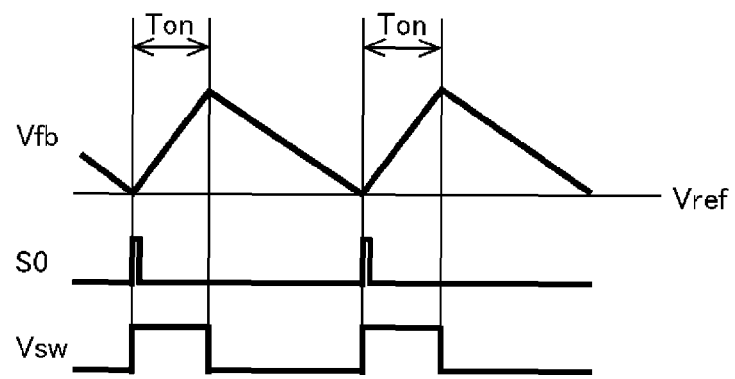
FIG. 8B is an operation waveform chart illustrating a general example of the fixed on-time with bottom detection type switching power supply device.

FIG. 6 is a block diagram illustrating a structural example of a television set including the switching power supply device described above. In addition, FIGS. 7A to 7C respectively illustrate a front view, a side view, and a rear view of the television set including the switching power supply device described above. A television set A of this structural example includes a tuner portion A1, a decoder portion A2, a display portion A3, a speaker portion A4, an operating portion A5, an interface portion A6, a control portion A7, and a power supply unit A8.

The tuner portion A1 selects a broadcasting signal of a desired channel from a reception signal received by an antenna A0 externally connected to the television set A.

The decoder portion A2 generates a video signal and an audio signal from the broadcasting signal selected by the tuner A1. In addition, the decoder portion A2 also has a function of generating the video signal and the audio signal based on an external input signal from the interface portion A6.

The display portion A3 outputs an image of the video signal generated by the decoder portion A2.

The speaker portion A4 outputs sound of the audio signal generated by the decoder portion A2.

The operating portion A5 is a human interface that receives a user's operation. As the operating portion A5, buttons, switches, a remote controller and the like can be used.

The interface portion A6 is a front-end that receives an external input signal from an external device (an optical disc player, a hard disk drive, or the like).

The control portion A7 integrally controls operations of the individual portions A1 to A6 described above. As the control portion A7, a central processing unit (CPU) or the like can be used.

The power supply unit A8 supplies electric power to the individual portions A1 to A7. As the power supply unit A8, the switching power supply device 1 described above can be appropriately used.

<Others>

Other than the embodiment described above, the structure of the present invention can be variously modified within the scope of the invention without deviation from the spirit thereof. In other words, the embodiment described above is merely an example in every aspect and should not be interpreted as a limitation. The technical scope of the present invention is defined not by the above description of the embodiment but by the claims, and should be understood to include all modifications within meanings and scopes equivalent to the claims.

INDUSTRIAL APPLICABILITY

The switching power supply device can be used as a power supply mounted in various electronic equipment such as a liquid crystal display, a plasma display, a BD recorder/player, a set top box, and a personal computer (for example, as a power supply for system-on-chip (SOC) or a power supply for peripheral equipment).

SUMMARY

The switching power supply device described above includes a switching control portion arranged to alternately switch between a fixed on-time having a fixed length in which an upper-side switch is turned on while a lower-side switch is turned off, and a variable off-time having a variable length in which the upper-side switch is turned off while the lower-side switch is turned on, so as to flow current in an inductor, for stepping down an input voltage to generate and output voltage; an on-time extending portion arranged to extend the on-time of the upper-side switch, if the output voltage is lower than a specified value at the time point when the fixed on-time elapses, until the output voltage reaches the specified value regardless of the fixed on-time; a lower-side overcurrent protection portion arranged to inhibit the lower-side switch from being turned off, if the current flowing in the inductor is larger than a bottom value threshold value at the time point when a feedback voltage corresponding to the output voltage is decreased to a reference voltage, until the current flowing in the inductor becomes the bottom value threshold value or less; and an upper-side overcurrent protection portion arranged to forcibly turn off the upper-side switch at the time point when the current flowing in the inductor becomes larger than a peak value threshold value during the on-time of the upper-side switch. The upper-side overcurrent protection portion sets the peak value threshold value to a value larger than the sum of the bottom value threshold value and a ripple component of the current flowing in the inductor during a period from start to end of the fixed on-time, and sets the peak value threshold value to a value equal to or smaller than the sum of the bottom value threshold value and the ripple component of the current flowing in the inductor during a period after the fixed on-time elapses until at least the upper-side switch is turned off (first structure).

In switching power supply device having the first structure described above, the fixed on-time may be determined by a function of the input voltage and the output voltage or an output set voltage (second structure).

In the switching power supply device having the first or second structure described above, the upper-side overcurrent protection portion may set the peak value threshold value to a value equal to or larger than the bottom value threshold value during a period after the fixed on-time elapses until the upper-side switch is turned on next time (third structure).

The switching power supply device having any one of the first to third structures described above may have a structure, in which if the upper-side switch is turned on at the time point when the overcurrent protection is enabled by the lower-side overcurrent protection portion so that the current flowing in the inductor becomes the bottom value threshold value or less, the on-time extending portion does not perform the on-time extending operation even if the output voltage is lower than the specified value at the time point when the fixed on-time elapses, and the peak value threshold value is set to a value larger than the sum of the bottom value threshold value and the ripple component of the current flowing in the inductor even during a period after the fixed on-time elapses until the upper-side switch is turned on next time (fourth structure).

The switching power supply device having the fourth structure described above may further includes a latch portion arranged to latch a state of the upper-side switch turning on at the time point when the overcurrent protection is enabled by the lower-side overcurrent protection portion so that the current flowing in the inductor becomes the bottom value threshold value or less, and to reset the latched state when the overcurrent protection is not enabled by the lower-side overcurrent protection portion in the next period or after, and the operation of the on-time extending portion and a change of the peak value threshold value may be limited by signal from the latch portion (fifth structure).

The switching power supply device having any one of the first to fifth structures described above may further include a ripple injection circuit arranged to superimpose a ripple voltage that simulates the current flowing in the inductor on the output voltage or a divided voltage thereof so as to generate the feedback voltage (sixth structure).

The switching power supply device having any one of the first to sixth structures described above may further include a reverse current detecting circuit arranged to detect a reverse current of the current flowing in the inductor so as to forcibly turn off the lower-side switch (seventh structure).

In addition, the television set described above includes a tuner portion arranged to select a broadcasting signal of a desired channel from a reception signal; a decoder portion arranged to generate a video signal and an audio signal from the broadcasting signal selected by the tuner; a display portion arranged to output an image of the video signal; a speaker portion arranged to output sound of the audio signal; an operating portion arranged to receive a user's operation; an interface portion arranged to receive an external input signal; a control portion arranged to integrally control the individual portions; and a power supply unit arranged to supply electric power to the individual portions, in which the power supply unit includes the switching power supply device having any one of the first to seventh structures (eighth structure).

What is claimed is:

1. A switching power supply device comprising:
    a switching control portion arranged to alternately switch between a fixed on-time having a fixed length in which an upper-side switch is turned on while a lower-side switch is turned off, and a variable off-time having a variable length in which the upper-side switch is turned off while the lower-side switch is turned on, so as to flow current in an inductor, for stepping down an input voltage to generate and output voltage;
    an on-time extending portion arranged to extend the on-time of the upper-side switch, if the output voltage is lower than a specified value at the time point when the fixed on-time elapses, until the output voltage reaches the specified value regardless of the fixed on-time;
    a lower-side overcurrent protection portion arranged to inhibit the lower-side switch from being turned off, if the current flowing in the inductor is larger than a bottom value threshold value at the time point when a feedback voltage corresponding to the output voltage is decreased to a reference voltage, until the current flowing in the inductor becomes the bottom value threshold value or less; and
    an upper-side overcurrent protection portion arranged to forcibly turn off the upper-side switch at the time point when the current flowing in the inductor becomes larger than a peak value threshold value during the on-time of the upper-side switch, wherein
    the upper-side overcurrent protection portion sets the peak value threshold value to a value larger than the sum of the bottom value threshold value and a ripple component of the current flowing in the inductor during a period from start to end of the fixed on-time, and sets the peak value threshold value to a value equal to or smaller than the sum of the bottom value threshold value and the ripple component of the current flowing in the inductor during a period after the fixed on-time elapses until at least the upper-side switch is turned off.

2. The switching power supply device according to claim 1, wherein the fixed on-time is determined by a function of the input voltage and the output voltage or an output set voltage.

3. The switching power supply device according to claim 1, wherein the upper-side overcurrent protection portion sets the peak value threshold value to a value equal to or larger than the bottom value threshold value during a period after the fixed on-time elapses until the upper-side switch is turned on next time.

4. The switching power supply device according to claim 1, wherein
    if the upper-side switch is turned on at the time point when the overcurrent protection is enabled by the lower-side overcurrent protection portion so that the current flowing in the inductor becomes the bottom value threshold value or less,
    the on-time extending portion does not perform the on-time extending operation even if the output voltage is lower than the specified value at the time point when the fixed on-time elapses, and
    the peak value threshold value is set to a value larger than the sum of the bottom value threshold value and the ripple component of the current flowing in the inductor even during a period after the fixed on-time elapses until the upper-side switch is turned on next time.

5. The switching power supply device according to claim 4, further comprising a latch portion arranged to latch a state of the upper-side switch turning on at the time point when the overcurrent protection is enabled by the lower-side overcurrent protection portion so that the current flowing in the inductor becomes the bottom value threshold value or less, and to reset the latched state when the overcurrent protection is not enabled by the lower-side overcurrent protection portion in the next period or after, wherein the operation of the on-time extending portion and a change of the peak value threshold value are limited by signal from the latch portion.

6. The switching power supply device according to claim 1, further comprising a ripple injection circuit arranged to superimpose a ripple voltage that simulates the current flowing in the inductor on the output voltage or a divided voltage thereof so as to generate the feedback voltage.

7. The switching power supply device according to claim 1, further comprising a reverse current detecting circuit arranged to detect a reverse current of the current flowing in the inductor so as to forcibly turn off the lower-side switch.

8. A television set comprising:
a tuner portion arranged to select a broadcasting signal of a desired channel from a reception signal;
a decoder portion arranged to generate a video signal and an audio signal from the broadcasting signal selected by the tuner;
a display portion arranged to output an image of the video signal;
a speaker portion arranged to output sound of the audio signal;
an operating portion arranged to receive a user's operation;
an interface portion arranged to receive an external input signal;
a control portion arranged to integrally control the individual portions; and
a power supply unit including the switching power supply device according to claim 1 so as to supply electric power to the individual portions.

9. A semiconductor integrated circuit constituting at least a part of a switching power supply device, the semiconductor integrated circuit comprising:
a switching control portion arranged to alternately switch between a fixed on-time having a fixed length in which an upper-side switch is turned on while a lower-side switch is turned off, and a variable off-time having a variable length in which the upper-side switch is turned off while the lower-side switch is turned on, so as to flow current in an inductor, for stepping down an input voltage to generate and output voltage;
an on-time extending portion arranged to extend the on-time of the upper-side switch, if the output voltage is lower than a specified value at the time point when the fixed on-time elapses, until the output voltage reaches the specified value regardless of the fixed on-time;
a lower-side overcurrent protection portion arranged to inhibit the lower-side switch from being turned off, if the current flowing in the inductor is larger than a bottom value threshold value at the time point when a feedback voltage corresponding to the output voltage is decreased to a reference voltage, until the current flowing in the inductor becomes the bottom value threshold value or less; and
an upper-side overcurrent protection portion arranged to forcibly turn off the upper-side switch at the time point when the current flowing in the inductor becomes larger than a peak value threshold value during the on-time of the upper-side switch, wherein
the upper-side overcurrent protection portion sets the peak value threshold value to a value larger than the sum of the bottom value threshold value and a ripple component of the current flowing in the inductor during a period from start to end of the fixed on-time, and sets the peak value threshold value to a value equal to or smaller than the sum of the bottom value threshold value and the ripple component of the current flowing in the inductor during a period after the fixed on-time elapses until at least the upper-side switch is turned off.

10. The semiconductor integrated circuit according to claim 9, wherein the fixed on-time is determined by a function of the input voltage and the output voltage or an output set voltage.

11. The semiconductor integrated circuit according to claim 9, wherein the upper-side overcurrent protection portion sets the peak value threshold value to a value equal to or larger than the bottom value threshold value during a period after the fixed on-time elapses until the upper-side switch is turned on next time.

12. The semiconductor integrated circuit according to claim 9, wherein
if the upper-side switch is turned on at the time point when the overcurrent protection is enabled by the lower-side overcurrent protection portion so that the current flowing in the inductor becomes the bottom value threshold value or less,
the on-time extending portion does not perform the on-time extending operation even if the output voltage is lower than the specified value at the time point when the fixed on-time elapses, and
the peak value threshold value is set to a value larger than the sum of the bottom value threshold value and the ripple component of the current flowing in the inductor even during a period after the fixed on-time elapses until the upper-side switch is turned on next time.

13. The semiconductor integrated circuit according to claim 12, further comprising a latch portion arranged to latch a state of the upper-side switch turning on at the time point when the overcurrent protection is enabled by the lower-side overcurrent protection portion so that the current flowing in the inductor becomes the bottom value threshold value or less, and to reset the latched state when the overcurrent protection is not enabled by the lower-side overcurrent protection portion in the next period or after, wherein
the operation of the on-time extending portion and a change of the peak value threshold value are limited by signal from the latch portion.

14. The semiconductor integrated circuit according to claim 9, further comprising a ripple injection circuit arranged to superimpose a ripple voltage that simulates the current flowing in the inductor on the output voltage or a divided voltage thereof so as to generate the feedback voltage.

15. The semiconductor integrated circuit according to claim 9, further comprising a reverse current detecting circuit arranged to detect a reverse current of the current flowing in the inductor so as to forcibly turn off the lower-side switch.

16. A television set comprising:
a tuner portion arranged to select a broadcasting signal of a desired channel from a reception signal;
a decoder portion arranged to generate a video signal and an audio signal from the broadcasting signal selected by the tuner;
a display portion arranged to output an image of the video signal;
a speaker portion arranged to output sound of the audio signal;
an operating portion arranged to receive a user's operation;

an interface portion arranged to receive an external input signal;
a control portion arranged to integrally control the individual portions; and
a power supply unit including the semiconductor integrated circuit according to claim 9 so as to supply electric power to the individual portions.

* * * * *